March 10, 1931.    J. G. JOHNSON    1,795,862
METHOD OF MOLDING AND APPARATUS THEREFOR
Filed Oct. 31, 1928    4 Sheets-Sheet 1
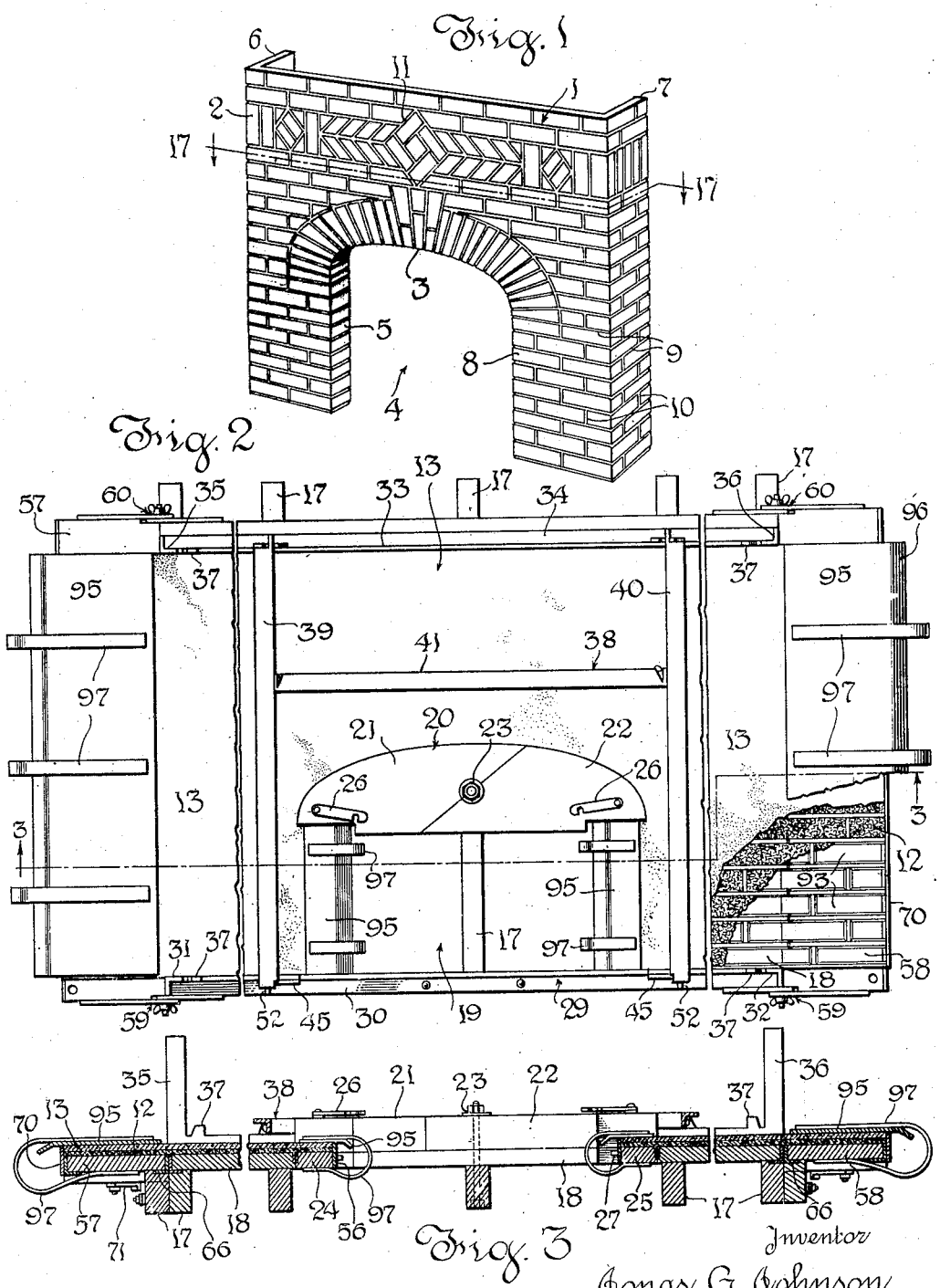

March 10, 1931.  J. G. JOHNSON  1,795,862
METHOD OF MOLDING AND APPARATUS THEREFOR
Filed Oct. 31, 1928  4 Sheets-Sheet 2
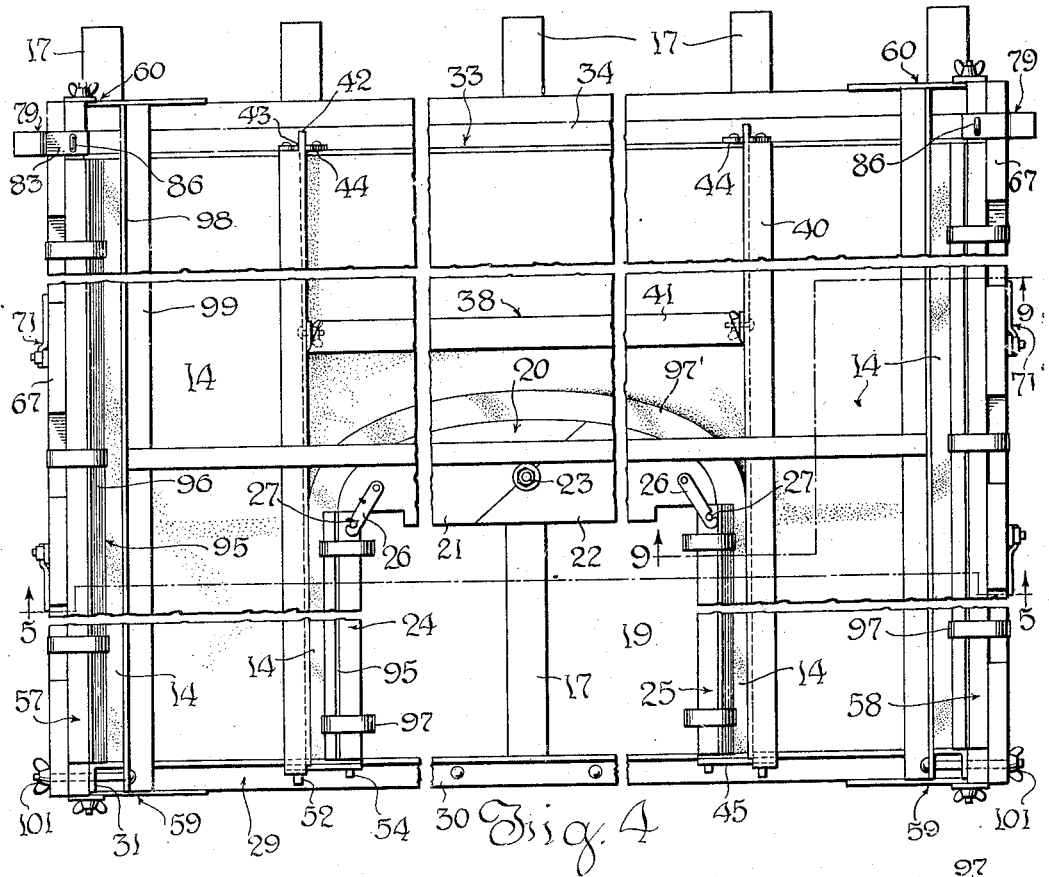
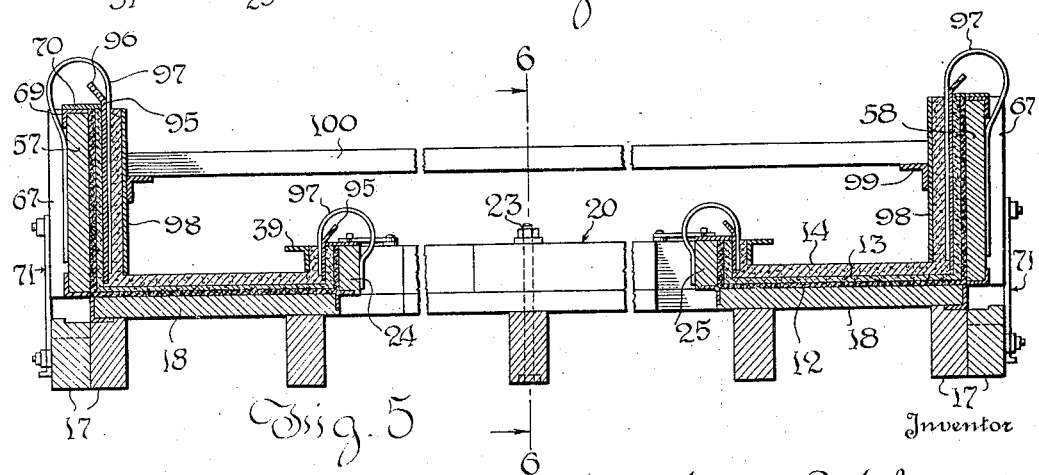
Inventor
Jonas G. Johnson
By Dodge and Sons
Attorneys

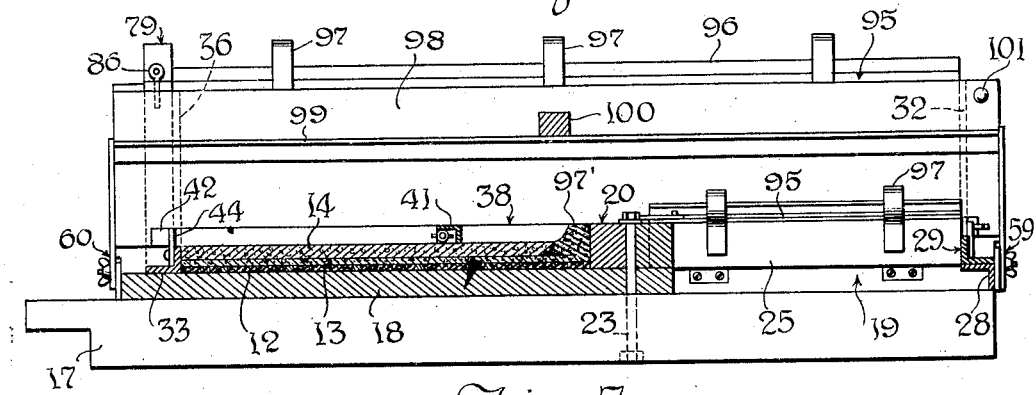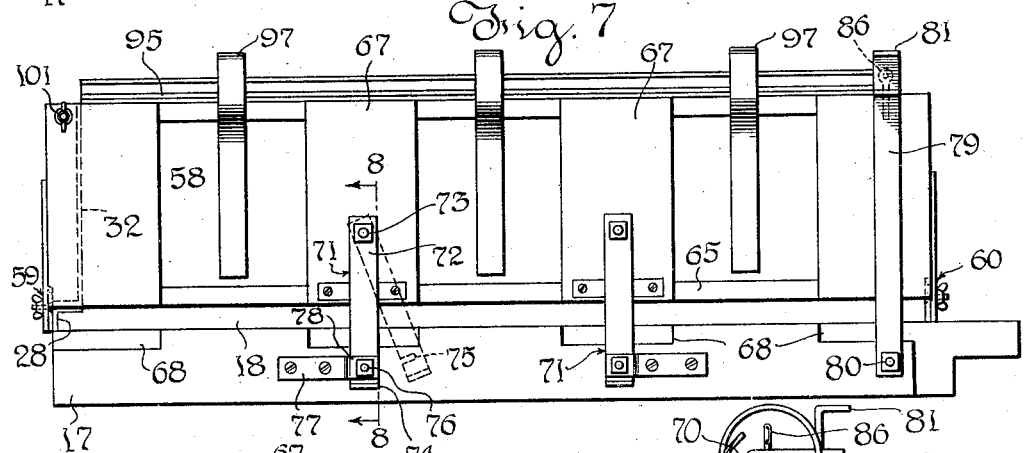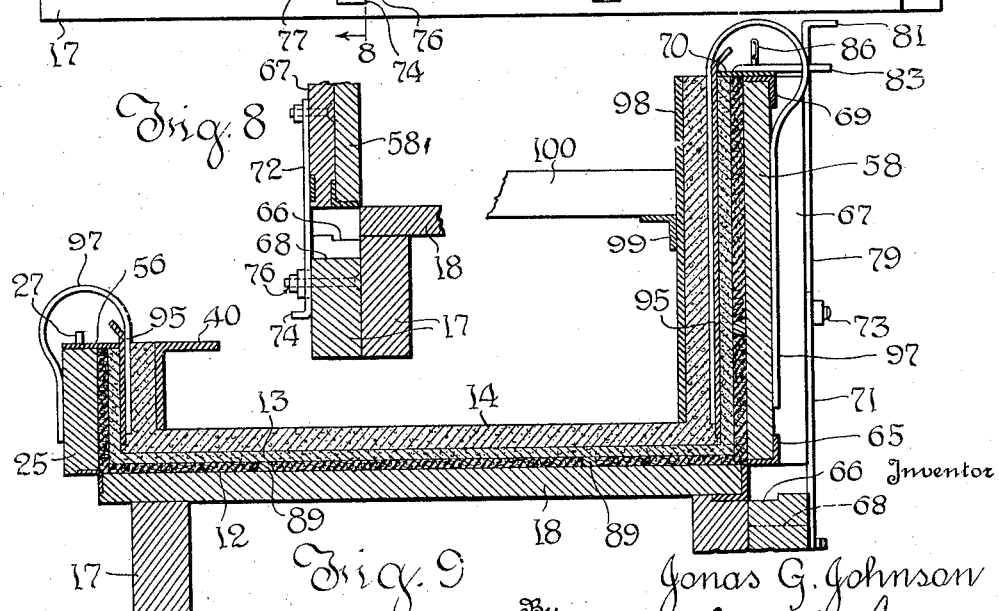

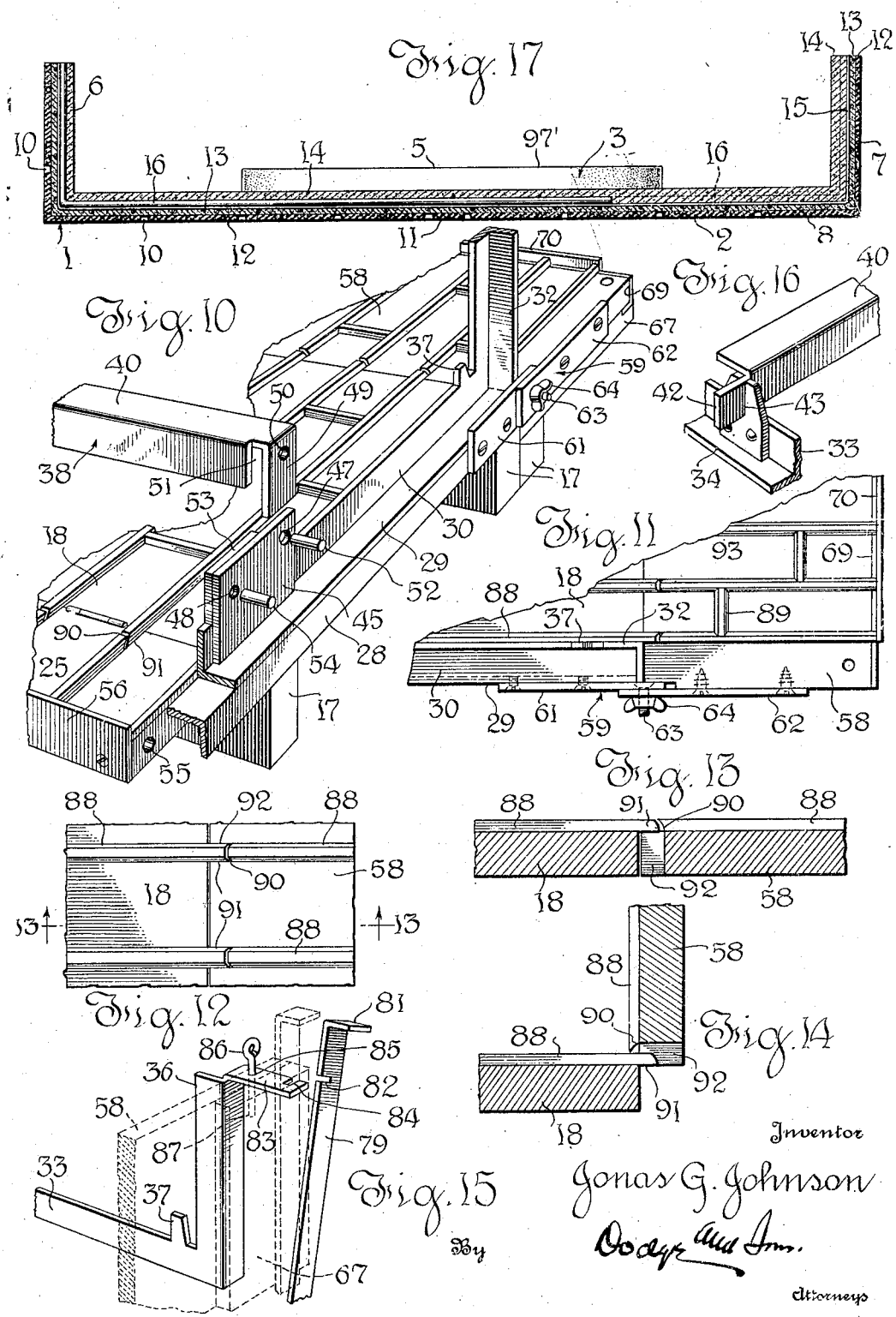

Patented Mar. 10, 1931

1,795,862

UNITED STATES PATENT OFFICE

JONAS G. JOHNSON, OF BALTIMORE, MARYLAND, ASSIGNOR TO THE READYBUILT PRODUCTS COMPANY, OF BALTIMORE, MARYLAND, A CORPORATION OF MARYLAND

METHOD OF MOLDING AND APPARATUS THEREFOR

Application filed October 31, 1928. Serial No. 316,204.

This invention relates to an improved method of molding structures or articles from plastic material, particularly cement and concrete, and also to the apparatus for carrying out the method. The invention is particularly applicable to the manufacture of what are now commercially called "portable fireplaces", and only this adaptation of the invention is illustrated and described. This is done solely, however, by way of example and is not to be taken as limiting the use of the invention to the field mentioned. Its usefulness in the various branches of the molding arts will be obvious.

The portable fireplaces referred to are usually made of cement or concrete provided with an outer surface or facing, generally of partially embedded crushed stone or the like, having a design formed therein to simulate the laid brick or other construction of ordinary built-up or stationary fireplaces. In the manufacture of these fireplaces, considerable difficulty has been encountered in forming the end faces of the fireplace and the corners where the end and front faces intersect, so that they will appear equally as well finished as the front face of the fireplace. Similar trouble has arisen also in finishing the edge of the fireplace opening or arch and the end faces of the bricks which extend within the opening.

The primary purpose of the invention disclosed herein is to provide a method and means whereby molded structures or articles may be readily manufactured with all of the faces and corners thereof which are presented to view having a uniform, finished appearance.

A further object is the provision of a fireplace mold in which the plastic material forming the outer surface of the structure, or which carries a facing layer for this purpose, may be poured in a continuous sheet of a size sufficient to include, not only the front face of the fireplace, but any returns, such as the end walls of the fireplace and the portion thereof located within the fireplace opening. It is intended that the mold then may be adjusted to bend the return-forming portions of the plastic sheet into their proper angular relation to the front face of the fireplace, means being provided to retain the parts of the form rigidly in position while the fireplace is being completed and the plastic material setting.

Another object, where brick or stone-faced fireplaces with motor joints are being made, is to construct the mold so that the mortar joints, particularly at the corners of the fireplace, are clean-cut and give the appearance of having been finished by a mason. Other objects will appear hereinafter.

In the accompanying drawings, wherein there is illustrated a practical embodiment of the invention as applied to the manufacture of "portable fireplaces" or "fireplace unit",—

Fig. 1 is a perspective view of a completed fireplace unit;

Fig. 2, a plan view of the mold or form in which the fireplace unit is made, the several gates of the mold being shown in their initial lowered position;

Fig. 3, a longitudinal section on line 3—3 of Fig. 2;

Fig. 4, a plan view of the mold, similar to Fig. 2, except that the parts are enlarged and the mold gates appear in their raised positions;

Fig. 5, a longitudinal section on line 5—5 of Fig. 4;

Fig. 6, a transverse section taken on line 6—6 of Fig. 5;

Fig. 7, an end elevational view taken at the right hand side of the mold as it appears in Fig. 4;

Fig. 8, a fragmentary vertical section taken on line 8—8 of Fig. 7, and showing certain of the details of one of the braces for the end gate;

Fig. 9, a section taken on line 9—9 of Fig. 4;

Fig. 10, a fragmentary perspective view of the lower right hand corner of the mold as it appears in Fig. 2, and before the plastic material is placed therein;

Fig. 11, a fragmentary plan view of the same corner of the mold;

Fig. 12, a fragmentary plan view showing the arrangement of the ribs on the adjoining mold sections;

Fig. 13, a longitudinal section taken on line 13—13 of Fig. 12;

Fig. 14, a similar view with the mold sections moved into angular relation to each other;

Fig. 15, a fragmentary perspective view, partly in phantom, showing one of the latch mechanisms at the upper part of the mold;

Fig. 16, a fragmentary perspective of the connection between the upper gate of the mold and one of the legs of the inner gate for the fireplace opening; and Fig. 17, a transverse section taken on line 17—17 of Fig. 1 and showing the reinforcements within the completed fireplace unit.

In Fig. 1 there is shown a completed fireplace unit produced by the method and with the means hereinafter described in detail. The unit 1 is formed in the main of plastic material, such as cement, and comprises the usual front wall or face 2 having an arch 3 surrounding the conventional fireplace opening 4. The arch or fireplace opening is surrounded by an integral return or wall 5 formed with the front wall 2. At its ends the fireplace is provided with end walls or returns 6, 7 which are also formed integral with the front wall 2, as will be hereinafter fully described.

As illustrated in the drawings, the fireplace is provided on its front face 2, end faces 6, 7, and on face 5 with a finish or facing which simulates laid brick. It is to be understood, however, that this facing may be plain, or it may be such as to simulate stone or any other suitable material.

Most of the bricks are shown laid horizontally, as at 8, and between these bricks there appear recessed mortar joints, extending horizontally, as at 9, and vertically, as at 10. The other bricks in the facing may be arranged in any desired position as shown at 11 in order to produce a pleasing design.

Reference is now had to Figure 17 which shows the internal construction of the fireplace walls. Each wall, as shown in the form of the invention illustrated, comprises three layers of material. The outer layer 12 consists of crushed stone or any suitable material by which the desired facing surface may be provided for the fireplace. The second or intermediate layer 13 consists of mortar cement or the like, and the innermost or backing layer 14 is also of mortar cement with which generally there is included a certain proportion of cinders. All of these layers are intimately united together to form an integral structure, as will more clearly appear from the detailed description of the method of manufacture. In some instances, it may be desirable to form layers 12 and 13 as one, this layer being of suitable material to provide the desired facing for the fireplace.

In order to reinforce the fireplace unit, particularly where the returns 5, 6 and 7 join the front wall 2, there is embedded in the intermediate cement layer 13 a section of mesh wire 15 which is of sufficient size to be co-extensive with the front wall 2 and the side walls 6, 7 of the fireplace. As shown in Fig. 17, the wire mesh member is bent upwardly at its ends so as to correspond to the shape of the finished fireplace. Immediately adjacent the wire mesh member 15 and embedded in the backing layer of cement and cinders 14 are a number of L or otherwise suitably shaped metal reinforcing members 16 which serve to further add rigidity to the structure.

The mold or form in which the portable fireplace just described is made is shown in Figs. 2–16, inclusive. A series of transverse supporting members 17 are provided for the mold and these may be located on any suitable table or the like (not shown). The mold proper includes a front wall or main section 18, which rests on the supporting members 17. Front wall 18, as shown in Fig. 2, is cut away at its lower edge to form an opening 19 conforming to the fireplace opening 4 of the unit shown in Fig. 1. Secured to the upper face of the front wall 18 of the mold is a collapsible or sectional arch forming member 20. This member is held in place by means of a bolt and nut extending between the parts 21, 22 of the arch forming member and through wall 18 and the central supporting member 17, as shown at 23 in Figs. 5 and 6.

Adjoining the arch forming member 20 and secured by suitable hinges to the straight edges of the fireplace opening 19 of the form is a pair of outer fireplace-opening gates 24, 25, which normally are disposed in the position shown in Fig. 3, namely, in substantially the same plane as the front wall 18 of the mold, or at least with their upper faces in the same plane with the upper face of the mold section 18. During the formation of the fireplace unit, the gates 24, 25 are moved to an upright position, as shown in Fig. 5, for a purpose which will be explained later. Each of the parts 21, 22 of the arch forming member 20 is provided with a pivoted latch 26, and each of the outer fireplace-opening gates 24, 25 has a pin 27 adapted to be engaged by the corresponding latch 26 to hold the gate in its upright position.

The lower edge of the front wall 18 of the mold has secured thereto an angle iron 28 (Fig. 10), which extends the length of the wall and has mounted securely on the horizontal flange thereof a bottom gate member 29 which is of general U-shape. Bottom gate 29 is also made of angle iron and comprises a base portion 30 and vertical legs 31, 32. At the upper edge of front wall 18 of the mold is a similar top gate 33, the base portion 34 of which rests on mold wall 18, and the legs 35, 36 whereof project upwardly from the mold, see Fig. 2. Bottom gate 29 and top gate 33 are substantially identical, except that they are reversed so that their vertical flanges are on the inside. Both the top and bottom gates are provided adjacent each of their upstanding legs with lugs 37, the lugs being spaced somewhat from the inner flanges of the legs for a purpose appearing hereinafter.

The bottom gate 29 and top gate 33 are adapted to receive and support the inner gate 38 for the fireplace opening. Inner gate 38 is likewise formed of angle iron and comprises a pair of transverse members 39, 40 suitably connected together by a longitudinal member 41. As shown in Figs. 4 and 16, the upper ends of members 39, 40 have their vertical flanges extended so as to form projections 42 which engage in the slots 43 formed in the upper ends of members 44, which are riveted or otherwise secured to the vertical flange of the top gate 33. In order that the bottom gate 29 may support the inner fireplace gate 38, the vertical flange on the base of bottom gate 29 has secured thereto, on the outer side of the flange, a pair of small vertically disposed plates 45, 45, each of which is provided near its upper edge with a pair of perforations 47, 48. In order that they may properly interlock with plates 45, 45, the lower ends of members 39, 40 of the inner fireplace gate have their horizontal flanges extended somewhat beyond the ends of the vertical flanges and then bent downwardly at right angles so as to form a hook-shaped portion 49 having a perforation 50 adapted, when the parts are in place, to register with perforation 47 in plates 45, 45. The provision of the hook-shaped member 49 forms a slot 51 on the inner fireplace gate, into which plate 45 slips when the gate is lowered into place, as appears clearly in Fig. 4. Holes 47 and 50 are then in registry and receive pin 52 to lock the parts in place.

Plates 45, 45 each have secured to the inner face thereof a filler plate 53, so as to give the proper form to the mold at this point. Each plate 53 has an opening therein (not shown) registering with opening 48 in plate 45 and adapted to receive a pin 54, which pin projects through these plates and into opening 55 in the lower edge of the corresponding outer fireplace-opening gate when the latter is in its vertical position, see Fig. 4.

In the manner above described, the inner fireplace-opening gate 38 is firmly secured in place, and the outer fireplace-opening gates 24, 25 are secured in vertical position at their lower ends. When in their vertical position, the last mentioned gates, as before stated, are also held in place at their upper ends by pins 27, 27 and the latches 26, 26 which are swung into engagement therewith as shown in Fig. 4. In this connection, note that arch forming member 20 is of sufficient thickness so that its upper face is in substantially the same plane as the upper edges of the inner fireplace-opening gates 24, 25, when the latter are in the upright position of Fig. 5. These gates 24, 25 are each provided on their outer edges with material-retaining flanges 56.

Pivotally connected along the edges of the main mold wall 18 is a pair of outer end gates 57, 58. Each of the end gates is connected at its ends to the front mold wall 18 by means of a pair of special type hinges 59, 60, whereby the upper adjoining edges of the end gate and front wall 18 are maintained in substantial abutment irrespective of the angular position of the end gate with reference to the front wall of the mold. The purpose of this is to preclude the formation of any gap or crack between the end gate and the front wall of the mold which would permit leakage of the plastic material and consequent improper formation of the corner of the fireplace unit.

Each of the hinges 59, 60, as appears from Fig. 11, comprises a plate 61 secured to the lower edge of the front mold wall 18 and a second plate 62 mounted on the edge of the end gate. These plates overlap at their inner ends and are perforated to receive a pivot pin 63 which carries a wing nut 64 to aid in securing the end gate in its adjusted position. In order that the end gate may swing in the manner desired with reference to the front wall 18 of the mold as stated above, pivot pin 63 is located in line with the upper edge of the joint between the end gate and the front mold wall.

Each end gate 57, 58 is reinforced on its inner lower edge by an angle iron 65, which projects into a corresponding groove 66 in supporting member 17 when the end gate is in its horizontal position as shown in Fig. 3. The end gates are also reinforced by a series of vertically disposed battens 67 secured to their outer faces. When the end gates are in horizontal position, these battens project into the corresponding grooves 68 provided for this purpose in underlying supporting members 17. Each of the gates is reinforced along its outer lower edge by angle irons 69, to which are secured material-retaining strips 70, which, as shown in Fig. 3, project above the upper faces of the gates.

In order to rigidly hold the end gates 57, 58 in place when they are moved to the vertical position, as shown in Fig. 5, they are each provided with a series of bracing devices 71. These devices are mounted on the outer faces of the battens 67, and each comprises a lever 72, pivotally mounted at its upper end on the batten 67 by means of a nut and bolt 73. The lower end of the lever 72 is bent outwardly to form a handle portion 74. Intermediate its ends, lever 72 is provided on one edge with an open-ended notch 75 adapted to engage with a corresponding bolt 76 suitably mounted in a bracket 77 secured on the side of the transverse supporting member 17. Bracket 77 is bent outwardly at 78 away from the face of the supporting member 17, so as to receive therebeneath the notched end of lever 72. In this manner, the bracing devices 71 serve to maintain the end gates 57, 58 in the upright position.

In order to further secure the end gates 57, 58 in vertical position during the process of manufacture of the fireplace, each of the outer transverse supporting members 17 is provided near its upper end with an upright lever 79 which is pivotally mounted on the outer face of member 17 by means of bolt and nut 80. The upper end of lever 79 is bent outwardly to form a handle portion 81 and on one edge of the lever there is formed an open-ended slot 82. In securing the end gate in vertical position, pivoted lever 79 is adapted to coact with the upper end of the corresponding upright leg of the upper gate 33. For this purpose one of the flanges of the upper gate 33 is extended horizontally, as shown in Fig. 15, to form a projection 83. Projection 83 is provided on one edge with an open-ended slot 84 which is adapted to cooperate with slot 82 in pivoted lever 79 to secure the parts in place, as shown in dotted lines. Before pivoted lever 79 is swung upwardly into its vertical position, the end gate 57 is swung from its horizontal position into vertical position with its inner face against the corresponding upright leg of the top gate 33 and beneath projection 83. Projection 83 is perforated at 85 to receive a pin 86 which projects at its lower end into a suitable opening 87 provided in the outer edge of the end gate. Pin 86 serves to hold the gate upright at this point, but it is further secured from possible movement out of this position by pivoted lever 79 which is then swung upwardly into engagement with slotted projection 83.

In order that the outer surface of the finished product may be provided with grooves both horizontally and vertically disposed to simulate recessed mortar joints between the bricks, the upper faces of the front wall 18 of the mold, the end gates 57, 58 and the outer fireplace-opening gates 24, 25 are provided with longitudinal strips or ribs 88 and transverse strips or ribs 89. Where a joint or an effect other than the recessed mortar joint between laid bricks is desired, projections or ribs of other forms than that of the ribs disclosed in the accompanying drawings may be used. The upper surface of the ribs for producing the recessed mortar joints is flat and narrower than the base of the ribs and the sides of the ribs are somewhat inclined to produce the desired effect.

Particular reference is now had to Figs. 10 to 14, inclusive, in which is shown an arrangement whereby the horizontal mortar joints 9 of the fireplace, which extend as continuous joints or grooves around a corner or edge of the fireplace, may be produced in a clean-cut and workmanlike manner. It will be seen from the construction illustrated that the longitudinal ribs 88 on the return-forming portion of the mold, whether this be one of the outer end gates 57, 58, or one of the outer fireplace-opening gates 24, 25, are not carried up to the joint between the gate and the front wall 18 of the mold, but are cut off uniformly a slight distance from the joint and have their inner ends curved, as shown at 90 in Fig. 13. In a corresponding manner, the longitudinal ribs 88 on front wall 18 are carried beyond the joints between wall 18 and the several return-forming parts of the mold in order to form projecting rib portions 91. Rib projections 91 are of sufficient length to extend into close proximity to the curved inner ends 90 of the longitudinal ribs on the return-forming portions of the mold and are correspondingly curved on their outer ends to permit the necessary pivotal movements between the mold parts. In order also to permit this pivotal movement, the return-forming portions of the mold, viz:—outer end gates 57, 58 and outer fireplace-opening gates 24, 25, are provided on their inner edges with notches 92 into which rib projections 91 extend when the parts of the mold are moved into angular relationship, as shown clearly in Fig. 14.

Thus, it will be seen that with the construction described substantially continuous projections or ribs 88 are provided the entire length of the mold when all of the parts thereof are in horizontal position as shown in Fig. 2. In fact, these ribs are substantially continuous even when the mold parts are moved into angular relationship, such, for instance, as that shown in Fig. 14.

In molding a fireplace unit in the above described apparatus, the various parts of the mold are first placed in the positions shown in Fig. 3, that is, with the end gates 57, 58 and the fireplace-opening gates 24, 25 in their lowered positions. At this time, the inner fireplace-opening gate frame 38 is not in position in order that there may be ample room to place the material in the mold. Top gate 33 and bottom gate 29 should be in place and arch forming member 20 firmly secured in its proper position. This leaves free from obstructions the entire upper ribbed surface of the mold, which includes the upper faces of the main mold section 18 and the two pairs of gates 24, 25 and 57, 58. The mold in this condition is ready to receive the facing layer 12, which as stated, preferably consists of crushed stone. Any other suitable material, however, may be used and it may be of the same color as the intermediate mortar cement layer 13, see Fig. 17, or of a distinctive color.

The crushed stone 12 is placed in the pockets or recesses 93 which are formed on the face of the mold by the longitudinal and transverse ribs 88, 89, and each pocket filled so that the upper surface of the crushed stone layer is substantially flush with the upper surface of the ribs. It is desired to make it clear at this point that the crushed stone layer 12 is used to form a facing layer in all of the pockets 93, even those pockets which extend across the hinged joints between the front wall 18 of the mold and the several outer gates.

The entire upper surface of the mold and the crushed stone layer 12 is now covered with a continuous layer of cement mixture or mortar cement 13, the cement extending across the joints between the mold proper and the gates connected thereto. Cement layer 13 is allowed to stand for a comparatively short time, say about twenty minutes, during which period it enters into intimate contact with the crushed stone layer 12, thereby forming a continuous flat composite sheet.

In order to form the ends 6, 7 and the straight portions of fireplace opening return 5 integrally with the front wall 2 of the fireplace unit, it is now necessary to bend upwardly the portions of the composite sheet which are to form these returns. This is accomplished by moving the fireplace-opening and end wall gates from their horizontal to their vertical positions. Inasmuch as the plastic material 13 is only partially set when the gates are moved into their upright position, it is necessary to provide means for retaining the overlying portions of the composite layer on the various gates while they are being raised into and are retained in the vertical position.

For this purpose, each of the gates 24, 25, 57 and 58 is provided with a steel material-retaining plate 95, all of the plates being of the same construction, except that those for the gates 24, 25 are smaller to correspond to the size of these gates. Each plate 95, as appears from Figs. 2 and 3, is laid over the composite sheet of material on its gate so that the inner edge of the plate is spaced a slight distance from the inner edge of the gate. Plate 95 is of such length that it will fit between bottom and top gates 29, 33 when the end gate is raised, and is of a width so that it extends beyond the outer edge of the gate, where it is bent downwardly along its edge to form a handle portion 96. It will also be noted from Fig. 3 that material-retaining plate 95 bears on the upper edge of the material-retaining strip 70 on the outer edge of the gate. Plate 95 is secured in position by means of a series of one-piece spring metal clamps 97, as shown clearly in Figs. 2, 3 and 7.

End gates 57, 58 and fireplace-opening gates 24, 25 are now ready to be raised to the vertical position. As explained hereinbefore, gates 24, 25 are secured rigidly in this position by means of latches and pins 26, 27 and pins 54, 54. After the end gates 57, 58 are swung upwardly, each of them is secured in position by means of the series of bracing devices 71. The pivoted lever 79 which normally hangs in a depending position, is also swung upwardly into engagement with the projection 83 on the upper gate 33 and pin 86 is put into position to securely hold the upper end of the gate in place. Trowelling down may now be accomplished of any excess of the cement layer 13 which may have accumulated at the junctures of the front wall of the fireplace and the several returns, due to the bending of the composite sheet.

The next step, after all of the gates have been raised, is the placing of a quantity of a mixture of mortar cement and crushed stone on the cement layer 13 about the upper edge of the arch forming member 20, as shown at 97' in Figs. 2, 4 and 6. This material 97' is trowelled up against the member 20 so as to form the arch portion of the fireplace opening return 5 and is smoothed off on top substantially flush with the top face of member 20. The mortar and crushed stone mixture is carried down around the ends of member 20 to the meeting points of this member with fireplace-opening gates 24, 25.

After wire-mesh fabric 15 has been put in place and pressed somewhat into cement layer 13 and reinforcing members 16 have been positioned on wire fabric 15, that portion of the comparatively heavy backing layer 14 of cement and cinders that is formed on the back of the front wall 2 of the fireplace, is then poured over the reinforcements and trowelled up to the top and bottom gates 29, 33 and the several material-retaining plates 95.

An inner end gate 98 is now placed in position opposite each of the outer end gates 57, 58, with its lower edge resting snugly between the lugs 37, 37 on the top and bottom gates 29, 33 and the corresponding upstanding legs of these gates. Each inner gate 98 has suitably secured to its inner face a longitudinal reinforcing member 99 of angle iron. As shown in Figs. 4 and 5, inner gates 98, 98 are maintained in proper position against the legs of the top and bottom gates by means of a spacer bar 100, placed between gates 98, 98 and resting on the reinforcing members 99, 99.

Each inner end gate 98 is then rigidly secured at its outer lower corner by means of a bolt and wing nut 101 to the corresponding upright leg of the bottom gate 29 and the adjoining outer end gate, as shown in Fig. 4. These members are perforated at the point mentioned to receive the wing and nut device 101, whereby the parts may be drawn tightly together. The inner fireplace-opening gate frame 38 is now placed in position with its upper extremities 42, 42 in the notched upper ends of plates 44 provided for this purpose on upper gate 33, and with its lower extremities 49, 49 secured in position by means of pins 52, 52. From Fig. 9, it will be seen that with the inner end gates 98, 98 and the inner fireplace-opening frame 38 in place, the lower edges of these parts extend downwardly to the level of the upper face of the cement and cinders layer 14. As is shown in this same figure, the vacant space between transverse members 39, 40 of inner fireplace-opening gate 38 and the material-retaining plates 95 on outer fireplace-opening gates 24, 25, and the vacant space between inner end gates 98, 98 and material-retaining plates 95, 95 on outer end gates 57, 58, now are filled with cement and cinders mixture or backing material 14. Thus, it will be seen that this material along its lower edges is brought into intimate contact with that portion of the still plastic cinders and cement layer 14 which has already been put in place on the front wall 18 of the mold, the several parts of the layer 14 thereby being amalgamated to form, in effect, a continuous integral layer when the material has set.

The material-retaining plates 95 on the outer end gates and the outer fireplace-opening gates are then pulled out vertically after the several clamps 97 have been removed. The cement layer 13 and the cement and cinders layer 14 within the several return molds being still in a plastic condition, they will flow into intimate contact with each other to amalgamate and thus also render integral the return walls of the fireplace unit.

The fireplace unit formed in the manner above described is permitted to remain in the mold for a sufficient length of time to completely set and harden, after which inner gates 38, 98, 98 are removed and the remaining mold parts released and moved into the positions shown in Figs. 2 and 3, that is, with all of the outer gates lowered. The mold is then stood up on its lower edge and the completed unit removed.

By means of the method described, the entire front, side and fireplace-opening walls of the fireplace unit are formed so as to produce a unitary structure. As is clearly evident, one of the most important factors in producing this unitary construction is the formation of the front and return walls of the fireplace in part from a continuous sheet of plastic material, the return portions of which are bent out of the plane of the front wall portion of the sheet, while the material is still in plastic condition, and maintained in this position until the material has fully set and hardened. This mode of procedure in manufacturing the fireplace, or other structure, is of particular advantage in forming perfectly faced corners on the structure, since with the method described the facing layer 12 of crushed stone, or the like, extends in unbroken form around the corners of the unit.

What is claimed is:

1. The method of making fireplaces which comprises forming a layer of facing material; superimposing a layer of plastic material on the layer of facing material to form a composite sheet, said sheet having portions thereof adapted to form the front and end walls of a fireplace; moving the end-wall portions of the composite sheet into angular relation to the front-wall portion while the material is still plastic; and maintaining the end-wall portions in such position until the plastic material sets.

2. The method of making fireplaces which comprises forming a layer of facing material; superimposing a layer of plastic material on the layer of facing material to form a composite sheet, said sheet having portions thereof adapted to form a front wall and a return for the fireplace; moving the return portion of the composite sheet into angular relation to the front wall portion while the material is still plastic; and maintaining the return portion in such position until the plastic material sets.

3. The method of molding structures which comprises forming a continuous sheet of plastic material having a facing thereon, bending a portion of said sheet out of the plane of an adjoining portion thereof, forming a backing of plastic material on said sheet, and permitting the plastic material to set.

4. The method of molding fireplaces which comprises pouring a continuous plastic sheet having a facing thereon, one portion of said sheet being adapted to form the front of the fireplace and adjoining portions the sides thereof, bending said side portions of the sheet at right-angles to the front portion while the material is still plastic, pouring a backing of plastic material on the sheet, and permitting the plastic material to set.

5. The method of forming structures of plastic material which comprises forming a layer of facing material, forming a layer of plastic material on the layer of facing material, bending a portion of the composite sheet thus formed, and permitting the plastic material to set.

6. The method of forming a fireplace of plastic material comprising forming a flat layer of crushed stone; pouring a continuous layer of cement on the crushed-stone layer, said layers together forming a composite sheet having a central portion adapted to form the front of a fireplace and a portion at each end thereof to form the ends of the fireplace; bending said end portions upwardly at substantially right-angles to the central portion of the sheet; pouring a backing layer of cement on the inner faces of the sheet; and allowing the cement to set.

7. A mold for making fireplaces of plastic material comprising, in combination, a front wall; a gate, said front wall and said gate being disposed end to end; and a pivotal connection between the adjoining ends of the front wall and the gate, the axis of said connection substantially coinciding with the inner adjoining edges of the front wall and the gate.

8. A mold for forming fireplaces of plastic material comprising, in combination, a front wall, said wall being provided with a fireplace opening; a pair of outer end-gates pivotally mounted on the ends of the front wall; a second pair of outer gates pivotally mounted on the opposite edges of the fireplace opening, the axes of the pivotal connections between the front wall and all of said outer gates substantially coinciding with the inner adjoining edges of the front wall and the outer gates; an inner end-gate; and an inner fireplace opening gate located between each of the outer end and outer fireplace opening gates, said inner gates being spaced from their corresponding outer gates and from the front wall of the mold.

9. The combination in a mold of a pair of walls disposed end to end; a hinge mounted on the upper edges of said walls; and a second hinge located on the lower edges of said walls, the axes of said hinges being in alignment with each other and substantially coinciding with the inner edges of said adjoining ends of the walls irrespective of the position of the walls relative to each other.

10. The combination in a mold for forming fireplaces from plastic material of a pair of walls pivotally connected together at adjoining edges, and longitudinal and transverse mortar-joint ribs provided on the inner faces of said walls, the inner ends of the longitudinal ribs on one of said walls being concave and the adjoining ends of the corresponding longitudinal ribs on the other wall being convex to permit said walls to be moved into angular relation to each other.

11. In a mold, the combination of a pair of walls hinged together at their inner edges; a projection on the inner face of one of said walls; and a corresponding projection on the inner face of the other wall, said projections providing a substantially continuous depression-forming protuberance irrespective of the positions of said walls relative to each other.

12. In a mold, the combination of a pair of walls hinged together so that their inner adjoining edges always remain substantially in contact with each other; a rib located on the inner face of one of said walls and projecting over said adjoining edges; and a corresponding rib on the inner face of the other wall, the adjoining ends of said ribs being disposed in close proximity to each other to provide a continuous groove-forming projection and shaped to permit relative angular movement of the walls, the second-mentioned wall being cut away to receive said projecting rib end.

13. In a form of the character described, the combination of a front wall; outer gates mounted on the ends of the front wall; inner end-gates arranged in spaced relation to said outer gates and to the front wall; and a pair of U-shaped members mounted in spaced relation on said front wall between the outer end-gates and supporting said inner end-gates.

In testimony whereof I have signed my name to this specification.

JONAS G. JOHNSON.